US008423447B2

(12) United States Patent
Treacy et al.

(10) Patent No.: US 8,423,447 B2
(45) Date of Patent: Apr. 16, 2013

(54) SYSTEM AND METHOD FOR ALLOCATING NOMINAL AND CASH AMOUNTS TO TRADES IN A NETTED TRADE

(75) Inventors: Paul A. Treacy, Kent (GB); Julian Clark, Essex (GB); Patricia Bevan, London (GB); Tim M. Palmer, Hertfordshire (GB); Jeffery E. Moore, Richmond, TX (US); Matthew S. Stark, The Woodlands, TX (US); Edward J. Coad, Chatham, NJ (US); Michael J. McNeillis, Middlesex (GB)

(73) Assignee: JP Morgan Chase Bank, New York, NY (US)

( * ) Notice: Subject to any disclaimer, the term of this patent is extended or adjusted under 35 U.S.C. 154(b) by 2191 days.

(21) Appl. No.: 10/996,324

(22) Filed: Nov. 23, 2004

(65) Prior Publication Data
US 2005/0222938 A1 Oct. 6, 2005

Related U.S. Application Data

(60) Provisional application No. 60/558,044, filed on Mar. 31, 2004.

(51) Int. Cl.
*G06Q 40/00* (2012.01)
(52) U.S. Cl.
USPC .............................................. 705/37; 705/35
(58) Field of Classification Search ...................... 705/35
See application file for complete search history.

(56) References Cited

U.S. PATENT DOCUMENTS

| | | | |
|---|---|---|---|
| 4,169,285 A | 9/1979 | Walker | |
| 4,648,038 A | 3/1987 | Roberts et al. | |
| 4,739,478 A | 4/1988 | Roberts et al. | |
| 4,742,457 A | 5/1988 | Leon et al. | |
| 4,752,877 A | 6/1988 | Roberts et al. | |
| 4,933,842 A | 6/1990 | Durbin et al. | ................. 364/408 |
| 5,121,469 A | 6/1992 | Richards et al. | |
| 5,222,019 A | 6/1993 | Yoshino et al. | |
| 5,257,369 A | 10/1993 | Skeen et al. | |
| 5,270,922 A | 12/1993 | Higgins | |
| 5,297,032 A | 3/1994 | Trojan et al. | |
| 5,305,200 A | 4/1994 | Hartheimer et al. | |
| 5,419,890 A | 5/1995 | Saidi | |

(Continued)

FOREIGN PATENT DOCUMENTS

| | | |
|---|---|---|
| WO | 98/43170 | 10/1998 |
| WO | 01/20530 | 3/2001 |

(Continued)

OTHER PUBLICATIONS

Silverman; A New Strategy for Giving Away Your Money, Wall Street Journal, D1, Oct. 6, 2004.

(Continued)

*Primary Examiner* — Samica L Norman
(74) *Attorney, Agent, or Firm* — Lowenstein Sandler LLP

(57) ABSTRACT

A system and method for allocating stock and cash amounts to individual trades in a netted trade. The system and method include bundling individual securities trades into a netted trade, transmitting the netted trade to a clearing house, receiving a settlement message from the clearing house, and allocating stock and cash amounts to individual trades in the netted trade in a manner consistent with the settlement message.

40 Claims, 6 Drawing Sheets

U.S. PATENT DOCUMENTS

| | | | |
|---|---|---|---|
| 5,454,104 A | 9/1995 | Steidlmayer et al. | |
| 5,462,438 A | 10/1995 | Becker et al. | |
| 5,497,317 A | 3/1996 | Hawkins et al. | 364/408 |
| 5,517,406 A | 5/1996 | Harris et al. | 364/408 |
| 5,557,798 A | 9/1996 | Skeen et al. | |
| 5,563,783 A | 10/1996 | Stolfo et al. | |
| 5,592,379 A | 1/1997 | Finfrock et al. | |
| 5,649,186 A | 7/1997 | Ferguson | |
| 5,675,746 A | 10/1997 | Marshall | |
| 5,706,502 A | 1/1998 | Foley et al. | |
| 5,710,889 A | 1/1998 | Clark et al. | |
| 5,724,593 A | 3/1998 | Hargrave, III et al. | |
| 5,778,157 A | 7/1998 | Oatman et al. | |
| 5,787,402 A | 7/1998 | Potter et al. | |
| 5,806,047 A | 9/1998 | Hackel et al. | 705/36 |
| 5,806,048 A | 9/1998 | Kiron et al. | |
| 5,819,273 A | 10/1998 | Vora et al. | |
| 5,832,461 A | 11/1998 | Leon et al. | |
| 5,845,266 A | 12/1998 | Lupien et al. | |
| 5,864,827 A | 1/1999 | Wilson | |
| 5,890,140 A | 3/1999 | Clark et al. | |
| 5,913,214 A | 6/1999 | Madnick et al. | |
| 5,918,218 A | 6/1999 | Harris et al. | 705/37 |
| 5,922,044 A | 7/1999 | Banthia | |
| 5,940,810 A | 8/1999 | Traub et al. | |
| 5,944,784 A | 8/1999 | Simonoff et al. | |
| 5,946,667 A | 8/1999 | Tull, Jr. et al. | |
| 5,950,176 A | 9/1999 | Keiser et al. | |
| 5,966,531 A | 10/1999 | Skeen et al. | |
| 5,966,672 A | 10/1999 | Knupp | |
| 5,970,479 A | 10/1999 | Shepherd | |
| 5,986,673 A | 11/1999 | Martz | |
| 5,995,943 A | 11/1999 | Bull et al. | |
| 6,006,206 A | 12/1999 | Smith et al. | |
| 6,012,046 A | 1/2000 | Lupien et al. | |
| 6,018,714 A | 1/2000 | Risen, Jr. | |
| 6,018,721 A | 1/2000 | Aziz et al. | |
| 6,023,280 A | 2/2000 | Becker et al. | |
| 6,029,146 A | 2/2000 | Hawkins et al. | |
| 6,029,147 A | 2/2000 | Horadan et al. | |
| 6,035,287 A | 3/2000 | Stallaert et al. | 705/37 |
| 6,049,783 A | 4/2000 | Segal et al. | |
| 6,052,673 A | 4/2000 | Leon et al. | |
| 6,055,522 A | 4/2000 | Krishna et al. | |
| 6,058,378 A | 5/2000 | Clark et al. | |
| 6,061,662 A | 5/2000 | Makivic | |
| 6,064,984 A | 5/2000 | Ferguson et al. | |
| 6,073,104 A | 6/2000 | Field | |
| 6,073,115 A | 6/2000 | Marshall | |
| 6,078,914 A | 6/2000 | Redfern | |
| 6,078,956 A | 6/2000 | Bryant et al. | |
| 6,081,774 A | 6/2000 | de Hita et al. | |
| 6,088,685 A | 7/2000 | Kiron et al. | |
| 6,092,056 A | 7/2000 | Tull, Jr. et al. | |
| 6,105,005 A | 8/2000 | Fuhrer | |
| 6,131,082 A | 10/2000 | Hargrave, III et al. | |
| 6,134,600 A | 10/2000 | Liu | |
| 6,148,298 A | 11/2000 | LaStrange et al. | |
| 6,173,270 B1 | 1/2001 | Cristofich et al. | |
| 6,173,276 B1 | 1/2001 | Kant et al. | |
| 6,178,420 B1 | 1/2001 | Sassano | |
| 6,185,567 B1 | 2/2001 | Ratnaraj et al. | |
| 6,195,647 B1 | 2/2001 | Martyn et al. | |
| 6,226,623 B1 | 5/2001 | Schein et al. | |
| 6,233,566 B1 | 5/2001 | Levine et al. | |
| 6,236,972 B1 | 5/2001 | Shkedy | |
| 6,236,977 B1 | 5/2001 | Verba et al. | |
| 6,243,670 B1 | 6/2001 | Bessho et al. | |
| 6,260,021 B1 | 7/2001 | Wong et al. | |
| 6,263,321 B1 | 7/2001 | Daughtery, III | |
| 6,263,335 B1 | 7/2001 | Paik et al. | |
| 6,266,683 B1 | 7/2001 | Yehuda et al. | |
| 6,272,474 B1 | 8/2001 | Garcia | |
| 6,275,229 B1 | 8/2001 | Weiner et al. | |
| 6,278,982 B1 | 8/2001 | Korhammer et al. | |
| 6,282,537 B1 | 8/2001 | Madnick et al. | |
| 6,285,986 B1 | 9/2001 | Andrews | 705/26 |
| 6,285,989 B1 | 9/2001 | Shoham | |
| 6,304,858 B1 | 10/2001 | Mosler et al. | |
| 6,313,854 B1 | 11/2001 | Gibson | |
| 6,317,726 B1 | 11/2001 | O'Shaughnessy | |
| 6,317,728 B1 | 11/2001 | Kane | |
| 6,321,212 B1 | 11/2001 | Lange | |
| 6,323,881 B1 | 11/2001 | Broulik et al. | |
| 6,332,163 B1 | 12/2001 | Bowman-Amuah | |
| 6,338,055 B1 | 1/2002 | Hagmann et al. | |
| 6,338,068 B1 | 1/2002 | Moore et al. | |
| 6,343,287 B1 | 1/2002 | Kumar et al. | |
| 6,347,307 B1 | 2/2002 | Sandhu et al. | |
| 6,349,291 B1 | 2/2002 | Varma | |
| 6,356,933 B2 | 3/2002 | Mitchell et al. | |
| 6,360,210 B1 | 3/2002 | Wallman | |
| 6,366,908 B1 | 4/2002 | Chong et al. | |
| 6,381,585 B1 | 4/2002 | Maples et al. | |
| 6,381,586 B1 | 4/2002 | Glasserman et al. | |
| 6,385,660 B2 | 5/2002 | Griesemer et al. | |
| 6,389,413 B2 | 5/2002 | Takahashi et al. | |
| 6,389,452 B1 | 5/2002 | Glass | |
| 6,401,080 B1 | 6/2002 | Bigus et al. | |
| 6,408,282 B1 | 6/2002 | Buist | |
| 6,418,417 B1 | 7/2002 | Corby et al. | |
| 6,421,653 B1 | 7/2002 | May | |
| 6,424,980 B1 | 7/2002 | Iizuka et al. | |
| 6,429,868 B1 | 8/2002 | Dehner, Jr. et al. | |
| 6,442,545 B1 | 8/2002 | Feldman et al. | |
| 6,446,110 B1 | 9/2002 | Lection et al. | |
| 6,457,066 B1 | 9/2002 | Mein et al. | |
| 6,460,021 B1 | 10/2002 | Kirksey | |
| 6,480,882 B1 | 11/2002 | McAdam et al. | |
| 6,489,954 B1 | 12/2002 | Powlette | |
| 6,490,584 B2 | 12/2002 | Barrett et al. | |
| 6,493,681 B1 | 12/2002 | Tertitski et al. | |
| 6,510,406 B1 | 1/2003 | Marchisio | |
| 6,516,303 B1 | 2/2003 | Wallman | 705/36 |
| 6,516,308 B1 | 2/2003 | Cohen | |
| 6,523,022 B1 | 2/2003 | Hobbs | |
| 6,556,987 B1 | 4/2003 | Brown et al. | |
| 6,564,250 B1 | 5/2003 | Nguyen | |
| 6,581,056 B1 | 6/2003 | Rao | |
| 6,581,062 B1 | 6/2003 | Draper et al. | |
| 6,598,028 B1 | 7/2003 | Sullivan et al. | |
| 6,601,044 B1 * | 7/2003 | Wallman | 705/36 R |
| 6,611,825 B1 | 8/2003 | Billheimer et al. | |
| 6,615,187 B1 | 9/2003 | Ashenmil et al. | |
| 6,629,097 B1 | 9/2003 | Keith | |
| 6,631,373 B1 | 10/2003 | Otani et al. | |
| 6,633,868 B1 | 10/2003 | Min et al. | |
| 7,047,218 B1 * | 5/2006 | Wallman | 705/36 R |
| 2001/0011241 A1 | 8/2001 | Nemzow | |
| 2001/0011242 A1 | 8/2001 | Allex et al. | |
| 2001/0018674 A1 | 8/2001 | Schein et al. | |
| 2001/0025264 A1 | 9/2001 | Deaddio et al. | |
| 2001/0032217 A1 | 10/2001 | Huang | |
| 2001/0042034 A1 | 11/2001 | Elliott | |
| 2001/0043235 A1 | 11/2001 | Best et al. | |
| 2001/0044771 A1 | 11/2001 | Usher et al. | |
| 2001/0056398 A1 | 12/2001 | Scheirer | |
| 2002/0002530 A1 | 1/2002 | May | |
| 2002/0004777 A1 | 1/2002 | Foster et al. | |
| 2002/0007335 A1 | 1/2002 | Millard et al. | |
| 2002/0007358 A1 | 1/2002 | Johnson et al. | |
| 2002/0013753 A1 | 1/2002 | Marks de Chabris et al. | |
| 2002/0013862 A1 | 1/2002 | Orchard et al. | |
| 2002/0016762 A1 | 2/2002 | Feilbogen et al. | |
| 2002/0016819 A1 | 2/2002 | Sugimoto et al. | |
| 2002/0018077 A1 | 2/2002 | Powlette | |
| 2002/0022956 A1 | 2/2002 | Ukrainczyk et al. | |
| 2002/0023053 A1 | 2/2002 | Szoc et al. | |
| 2002/0026405 A1 | 2/2002 | Haar | |
| 2002/0026449 A1 | 2/2002 | Azencott | |
| 2002/0026462 A1 | 2/2002 | Shotton, Jr. et al. | |
| 2002/0029183 A1 | 3/2002 | Vlahoplus et al. | |
| 2002/0032644 A1 | 3/2002 | Corby et al. | |
| 2002/0035561 A1 | 3/2002 | Archer et al. | |
| 2002/0042767 A1 | 4/2002 | Kwan | |
| 2002/0049666 A1 | 4/2002 | Reuter et al. | |
| 2002/0054115 A1 | 5/2002 | Mack et al. | |

| | | | |
|---|---|---|---|
| 2002/0059141 A1 | 5/2002 | Davies et al. | |
| 2002/0065752 A1 | 5/2002 | Lewis | |
| 2002/0065755 A1 | 5/2002 | Shlafman et al. | |
| 2002/0069148 A1* | 6/2002 | Mutschler et al. | 705/35 |
| 2002/0069157 A1 | 6/2002 | Jordan | |
| 2002/0073007 A1 | 6/2002 | Ayache | |
| 2002/0078253 A1 | 6/2002 | Szondy et al. | |
| 2002/0087373 A1 | 7/2002 | Dickstein et al. | |
| 2002/0087454 A1 | 7/2002 | Calo et al. | |
| 2002/0087455 A1 | 7/2002 | Tsagarakis et al. | |
| 2002/0087457 A1 | 7/2002 | Madeley et al. | |
| 2002/0099646 A1 | 7/2002 | Agarwal et al. | |
| 2002/0099656 A1 | 7/2002 | Poh Wong | |
| 2002/0112056 A1 | 8/2002 | Baldwin et al. | |
| 2002/0120570 A1* | 8/2002 | Loy | 705/40 |
| 2002/0123947 A1 | 9/2002 | Yuste et al. | |
| 2002/0130868 A1 | 9/2002 | Smith | |
| 2002/0138390 A1 | 9/2002 | May | |
| 2002/0147671 A1 | 10/2002 | Sloan et al. | |
| 2002/0152154 A1 | 10/2002 | Rothman et al. | |
| 2002/0152156 A1 | 10/2002 | Tyson-Quah | |
| 2002/0156658 A1 | 10/2002 | Selesny et al. | |
| 2002/0156719 A1 | 10/2002 | Finebaum et al. | |
| 2002/0161692 A1 | 10/2002 | Loh et al. | |
| 2002/0161853 A1 | 10/2002 | Burak et al. | |
| 2002/0169707 A1 | 11/2002 | Koek et al. | |
| 2002/0174043 A1 | 11/2002 | Gilbert et al. | |
| 2002/0178096 A1 | 11/2002 | Marshall | |
| 2002/0184132 A1 | 12/2002 | Foster | |
| 2002/0184237 A1 | 12/2002 | McFeely | |
| 2002/0194097 A1 | 12/2002 | Reitz | |
| 2002/0194114 A1 | 12/2002 | Erdmier | |
| 2003/0004942 A1 | 1/2003 | Bird | |
| 2003/0009411 A1 | 1/2003 | Ram et al. | |
| 2003/0018558 A1 | 1/2003 | Heffner et al. | |
| 2003/0018714 A1 | 1/2003 | Mikhailov et al. | |
| 2003/0033212 A1 | 2/2003 | Sandhu et al. | |
| 2003/0037174 A1 | 2/2003 | Lavin et al. | |
| 2003/0065594 A1 | 4/2003 | Murphy | |
| 2003/0066025 A1 | 4/2003 | Garner et al. | |
| 2003/0066032 A1 | 4/2003 | Ramachandran et al. | |
| 2003/0078869 A1 | 4/2003 | Williams | |
| 2003/0088496 A1 | 5/2003 | Piotrowski | |
| 2003/0093360 A1 | 5/2003 | May | |
| 2003/0093362 A1 | 5/2003 | Tupper et al. | |
| 2003/0093565 A1 | 5/2003 | Berger et al. | |
| 2003/0105981 A1 | 6/2003 | Miller et al. | |
| 2003/0115122 A1 | 6/2003 | Slater et al. | |
| 2003/0126063 A1 | 7/2003 | Reuter | |
| 2003/0126068 A1 | 7/2003 | Hauk et al. | |
| 2003/0126069 A1 | 7/2003 | Cha | |
| 2003/0126117 A1 | 7/2003 | Megiddo et al. | |
| 2003/0140035 A1 | 7/2003 | Burrows | |
| 2003/0149653 A1 | 8/2003 | Penney | |
| 2003/0154071 A1 | 8/2003 | Shreve | |
| 2003/0158949 A1 | 8/2003 | Miller et al. | |
| 2003/0188255 A1 | 10/2003 | Shimizu et al. | |
| 2003/0220861 A1 | 11/2003 | Broms et al. | |
| 2003/0220868 A1 | 11/2003 | May | |
| 2003/0233459 A1 | 12/2003 | Miller et al. | |
| 2003/0236862 A1 | 12/2003 | Miller et al. | |
| 2003/0236957 A1 | 12/2003 | Miller et al. | |
| 2004/0039692 A1 | 2/2004 | Shields et al. | |
| 2004/0064397 A1 | 4/2004 | Lynn et al. | |
| 2004/0068559 A1 | 4/2004 | Shaw | |
| 2004/0078248 A1 | 4/2004 | Altschuler | |
| 2004/0103003 A1 | 5/2004 | Mayers et al. | |
| 2004/0128169 A1 | 7/2004 | Lusen | |
| 2004/0148247 A1 | 7/2004 | Miller et al. | |
| 2004/0148259 A1 | 7/2004 | Reiners et al. | |
| 2004/0162775 A1 | 8/2004 | Winklevoss et al. | |
| 2004/0167850 A1 | 8/2004 | Dreyer et al. | |
| 2004/0220885 A1 | 11/2004 | Salzmann et al. | |
| 2004/0225596 A1 | 11/2004 | Kemper et al. | |
| 2005/0060256 A1 | 3/2005 | Peterson et al. | |
| 2005/0086170 A1 | 4/2005 | Rao | |

FOREIGN PATENT DOCUMENTS

| | | |
|---|---|---|
| WO | 01/37540 | 5/2001 |
| WO | 01/57716 | 8/2001 |
| WO | 01/59670 | 8/2001 |
| WO | 02/03774 | 1/2002 |
| WO | 02/14991 | 2/2002 |
| WO | 02/054189 | 7/2002 |
| WO | 02/056146 | 7/2002 |
| WO | 02/063516 | 8/2002 |
| WO | 02/065278 | 8/2002 |
| WO | 02/065286 | 8/2002 |
| WO | 03/012588 | 2/2003 |
| WO | 03/030013 | 4/2003 |
| WO | 03/032158 | 4/2003 |
| WO | WO 03/065256 A1 | 8/2003 |
| WO | 03/102733 | 12/2003 |

OTHER PUBLICATIONS

Unknown; Investigating Systems; Oct. 21, 2002.
Elkayam; Using Indexed Bonds to Estimate a Central Bank Reaction Function; Prelim. Draft; Apr. 11, 2002.
Ericson; Softwerc Releases Patent-Pending.
IBM Corp.; Strict Read Order Control for a Queing System.
Novell, Inc.; Beginning of Viewing Information and Viewing Basic Information About a Print Job; Publ. Jun. 1, 1993.
Hewlett-Packard; X4QUEVIEW.Org; Publ. Mar. 1992.
Electronic Trading Tools;www.gheo.com/custerservices/trading_platforms.asp.
Fast Email Extractor 4.4; www.lecom.com/fee.html; Sep. 2, 2003.
Intellseek and Inxight Partner to Provide New Business Intelligence Solutions, www.inxight.com/news/021029_intelliseek.html, Oct. 29, 2002.
Myllymaki; With Standard XML Technologies; IBM Almaden Research Center; May 2, 2001.
Ribiero-Neto et al.; Top Down Extraction of Semi-Structured Data, String Processing and Information Retrieval Symposium & AMP; p. 176; Sep. 21, 1999.
Rupali et al.; Phrase-Based Text Representation for Managing the Web Documents; p. 165; Apr. 28, 2003.
May; Modeling and Querying Structure and Contents of the Web, 10th International Workshop on Database & AMP; Expert Systems Applications, Sep. 1, 1999, p. 721.
Manco et al.; A Framework for Adaptive Mail Classification, 14th IEEE Conference on Tools With Artificial Intelligence (ICTAI'02), Nov. 4, 2002, p. 387.
Carchiolo et al.; Structuring the Web; 11th International Workshop on Database and Expert Ssytems Applications (DEX A'00); Sep. 6, 2000.
Lam et al.; Querying Web Data—The WebQA Approach; p. 139; Dec. 12, 2002.
Witten et al.; Text Mining: A New Frontier for Lossless Compression; p. 198; Mar. 29, 1999.
Calado; The Web-DL Environment for Building Digital Libraries From the Web.
Czejdo; Automatic Generation Ontology Based Anntations in XML and Their Use in Retrieval Systems, Web Information Systems Engineering, 2000, Proceedings of the First International Conference, Jun. 19, 2000, p. 296.
Roberts; Top Priority on Bottom Line: More Companies Seeting to Manage Business Risks; p. 3; Mar. 20, 2000.
Chacko; Cephalon, Inc. Taking Risk Management Gherory Seriously.
Pila; in Case of Emergency; Contingent Capital; No. 6, vol. 102, p. 59; ISSN 1527-5914; Sep. 1, 2001.
Kus; Contingent Capital: Just in the Capital Management Sets a New Standard; Sponsored Statement; p. 30; ISSN: 0958; Oct. 1, 2002.
Martin; Email Report, Issue 11, August 16, 2001, Printed Aug. 2, 2005.
Emery, et al.; The Measurement of Liquidity, Journal of Accounting Research, vol. 20, No. 2, Part 1, p. 290-303, Autumn 1982.
Form 10-K, United States Securities and Exchange Commission, no Date,Year Ending Dec. 31, 2003.

Rising to the Challenge of Global STP; p. 51-52; ISSN: 0951-3604; Euromoney Publications PLC Global Inventor; Nov. 1999.

The Internet and the Future of Financial Markets; Assoc. for Computing Machinery, Inc., Nov. 1, 2000; Sec. 11, vol. 43; p. 82; ISSN: 0001-0782.

STP in the Bond Market; Wall Street & Technology; Dec. 1, 2002; p. 20.

TradeWeb's STP Vision; Euromoney Institutional Investor PLC; Feb. 1, 2003; Sec. 406, vol. 34, p. S6; ISSN: 0014-2433.

Block Trades Market Practice; Securities Market Practice Group; Apr. 2003.

* cited by examiner

US 8,423,447 B2

SYSTEM AND METHOD FOR ALLOCATING NOMINAL AND CASH AMOUNTS TO TRADES IN A NETTED TRADE

CROSS-REFERENCE TO RELATED APPLICATION

This application claims the benefit of U.S. Provisional Application No. 60/558,044, filed Mar. 31, 2004, the entire disclosure of which is hereby incorporated herein by reference.

BACKGROUND OF THE INVENTION

This invention relates to allocating stock and cash amounts to a plurality of trades that have been bundled together for settlement purposes. Conventionally, traders of securities have had to pay settlement fees to stock exchanges, or clearing houses, on each trade executed. This situation has led to unacceptably high fees for organizations that have many traders each executing large quantities of trades.

SUMMARY OF THE INVENTION

These problems are addressed and a technical solution achieved in the art by a system and method for allocating stock and cash amounts to individual trades in a netted trade. The system and method include combining individual securities trades into a "netted trade," transmitting the netted trade to a clearing house, receiving a settlement message from the clearing house applicable to the netted trade, and allocating stock and cash amounts to individual trades in the netted trade in a manner consistent with the settlement message.

"Netting" is the process of combining a group of trades into a single bundled trade ("netted trade"). The netted trade allows for a single settlement charge based upon the netted trade, instead of individual settlement charges for each trade.

When a trade is bundled and settled in bulk, the clearing house transmits a settlement message to the organization that sent the netted trade. The settlement message indicates the net amount of stock and cash delivered based upon all of the combined individual trades. The efficiency of a netting procedure is therefore dependent upon the manner in which the netted trade is broken down into its individual trades in a manner consistent with the settlement message.

The system and method of the present invention efficiently breaks down the netted trade by performing actions including identifying individual trades eligible for stock and cash allocation, sorting the individual trades so that the smallest trade is processed first, and allocating available stock and cash to the sorted purchase and sales trades based upon an available amount of stock and cash to be allocated. The system and method also verifies the net amount of stock and cash allocated to the net amount of stock and cash delivered with the settlement message.

BRIEF DESCRIPTION OF THE DRAWINGS

A more complete understanding of this invention may be obtained from a consideration of this specification taken in conjunction with the drawings, in which.

DETAILED DESCRIPTION OF THE EXEMPLARY EMBODIMENT OF THE INVENTION

Figure 1:
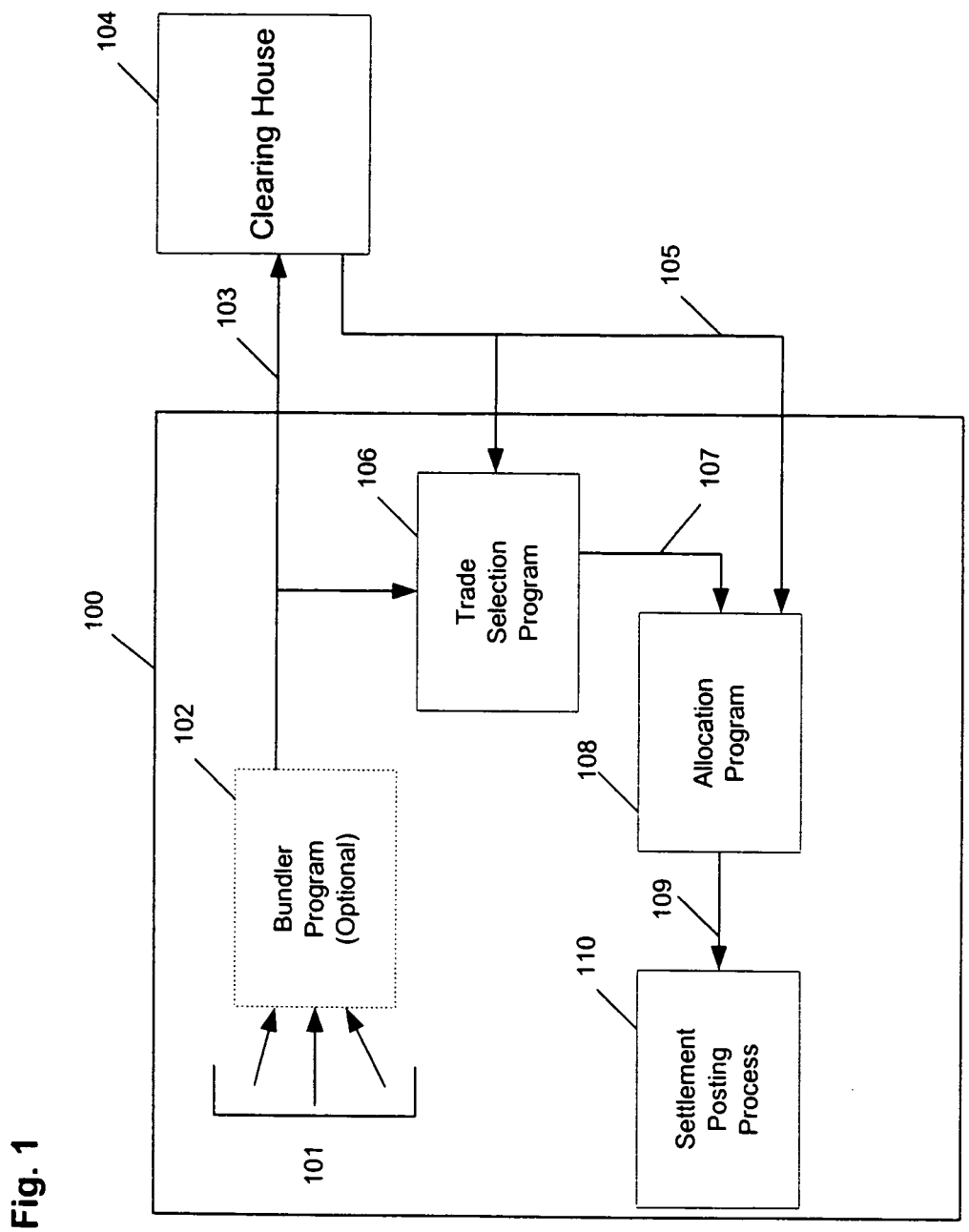
FIG. 1 illustrates data flow among the bundling, settlement, and allocation processes according to the exemplary embodiment of the present invention.

In order to reduce settlement fees charged by a clearing house on a trade-by-trade basis, multiple trades may be combined so that a single "bundled," or "netted," trade is transmitted to the clearing house and a single settlement fee is charged. The process of combining multiple trades is referred to herein as "bundling" or "netting."

Netting is described with reference to FIG. 1, in which an internal computer system 100 communicates via a communication device known in the art with an external stock exchange, or clearing house system 104. "Internal" means belonging to the organization that desires to transmit a netted trade to a clearing house. While this invention is described in terms of an internal system communicating with an external clearing house system, one having ordinary skill in the art will appreciate that this invention is not limited to the types of systems communicating.

In the internal system 100, multiple trades 101 are preferably input into an optional bundling program 102. The bundling program 102, as well as all other programs 106, 108, and 110 shown in FIG. 1 may be stored in a storage device, such as a computer-readable memory communicatively connected to a processing component within the system 100 for execution. The bundling program 102 combines all of the data of all of the individual trades 101 into a single netted trade 103. The bundling program 102 may combine this data by adding each trade as a row in a table, where the table represents the netted trade 103. The netted trade 103 is then transmitted to the clearing house 104 for processing. The clearing house 104 then transmits a settlement message 105 back to the internal system 100. The settlement message 105 includes the total net amount of stock and cash resulting from the netted trade. The settlement message 105 also includes underlying trade information, such as trade identifiers, dates, and trade types, (e.g., buy or sell) for each of the trades in the netted trade.

However, it should be noted that the bundling program 102 may be performed by the clearing house 104, and reference numeral 103 may alternatively represent the multiple trades 101 being transmitted to the clearing house 104 and the trade selection program 106, discussed later. In this scenario, when the multiple trades 101/103 are transmitted to the clearing house 104, the clearing house 104 still generates a single settlement message 105 that is transmitted back to the internal system 100 for processing as described in this specification.

The data in the netted trade 103 (or the data from the multiple trades 101/103 as the case may be) is also input into a trade selection program 106, which identifies individual trades in the netted trade 103 (or individual trades of the multiple trades 101/103 as the case may be) that are eligible for stock and cash allocation in response to receipt of the settlement message 105. The trade selection program 106 is described in more detail later with respect to 205 in FIG. 2.

The trades eligible for allocation 107, which may be in table format, are input into an allocation program 108, along with the settlement message 105. The allocation program 108 allocates available stock and cash to the trades 107 and verifies that such allocation is consistent with the settlement message 105. The allocation program 108 outputs a modified table 109 that includes the trades identified at 107 and the amount of stock and cash allocated to each of these trades. The allocation program 108 is described in more detail later with respect to 208 in FIG. 2.

Figure 2:
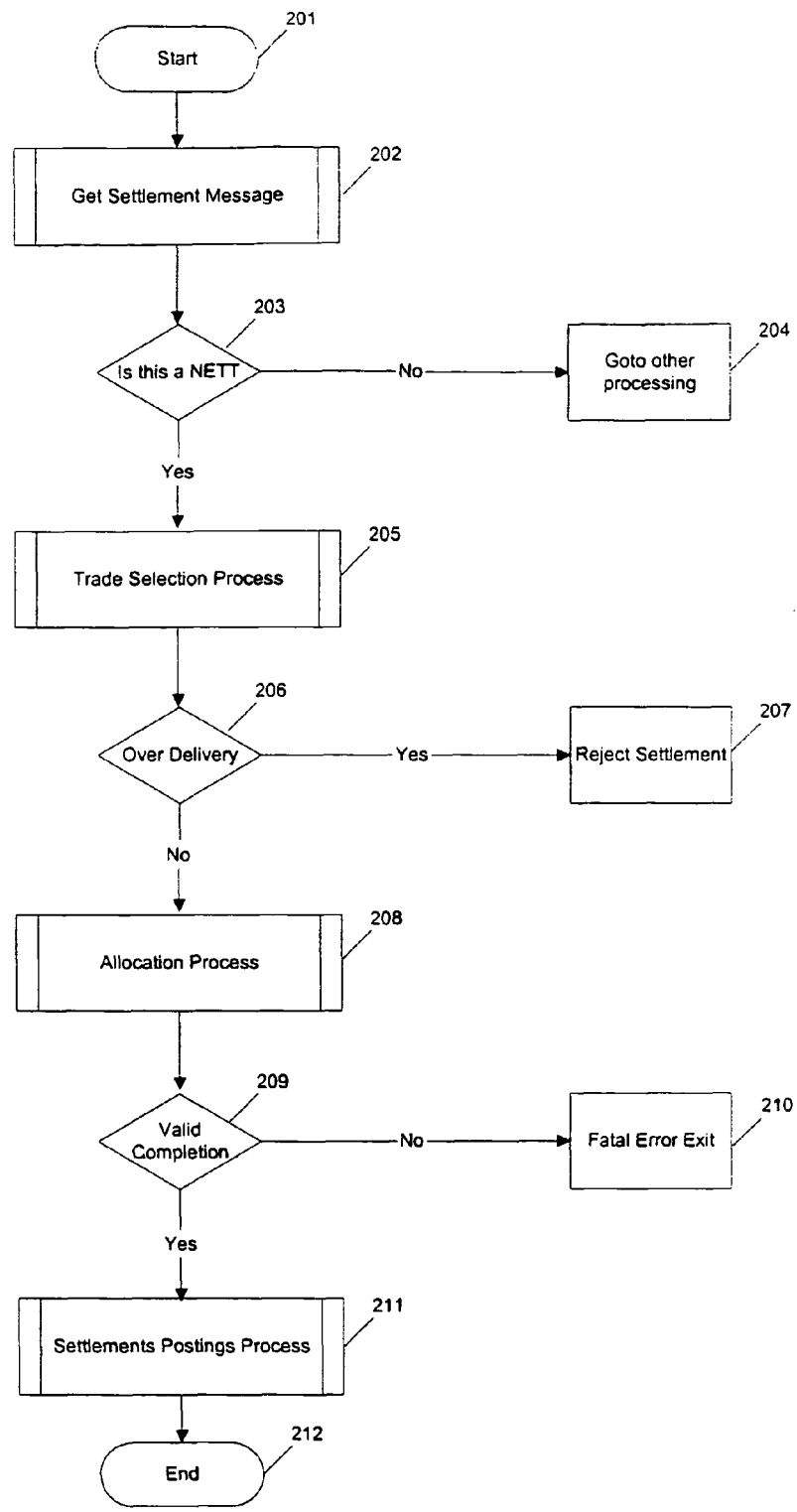
FIG. 2 is an overview of processing a settlement message according to this exemplary embodiment.

The output 109 of the allocation program 108 is input into the settlement posting process 110, which is described later with respect to 211 in FIG. 2.

The method of processing a settlement message 105 according to the exemplary embodiment of the present invention will be described with reference to FIGS. 2-4B. Referring to FIG. 2, the process begins at start 201 and proceeds to 202 where the settlement message is obtained, typically from a computer-readable storage device. Because allocation processing according to the exemplary embodiment applies to settlement messages pertaining to netted trades ("netted settlement messages"), the type of the settlement message is checked at 203. The type of the settlement message may be determined by checking the header or a tag in the message, or by comparing a trade identifier in the message with internal data that may identify the type of the trade. If it is not a netted settlement message, e.g., it is a settlement message pertaining to a single trade instead of a netted trade, the message is processed according to other techniques at 204.

If it is a netted settlement message at 203, the trades that are eligible for settlement are identified at 205 based on the netted settlement message received. Selection of trades eligible for settlement is achieved by matching a trade identifier in the settlement message with internal trade identifiers. If a match is made and the identified trade is "open," it is selected. Eligible trades may also be selected by searching internal records for open trades having the same trade date, instrument ISIN code, holding depot, and settlement currency as trades identified in the settlement message. In addition, some settlement messages, such as a "Swift" settlement message, as known in the art, can only either be a delivery or receipt message. In this situation, where the total traded position as identified by internal records is neither a net buy nor a net sell, then only those trades which are in the direction of the settlement are selected. For example, it the total traded position is a net buy, only buy trades are selected.

For each selected trade, the trade identifier, the buy/sell indicator and the total stock and total cash to be settled are placed into a table which is passed to the allocation processing system (108 in FIG. 1). By convention, in this table and throughout this specification, sales trades have stock (also known as "nominal") amounts that are negative and cash amounts that are positive. On the other hand, purchase trades have stock amounts that are positive and cash amounts that are negative.

Once the trades eligible for settlement have been identified at 205, the settlement message is processed to determine if over delivery of stock and/or cash has occurred at 206. For example, if the net stock amount delivered, as indicated in the settlement message, is positive and is greater than the total amount of stock purchased by all purchase trades in the netted trade, then the settlement message is rejected at 207. Also, if the net stock amount delivered, as indicated in the settlement message, is negative and is less than the total amount of stock sold by all sales trades in the netted trade, then the settlement message is also rejected at 207. The cash delivered amount is validated in a corresponding manner, however a specified tolerance amount, such as $50.00 US, is built in. In other words, if an over delivery of an amount less than the tolerance amount occurs, then no error message occurs, and allocation processing begins at 208.

Allocation processing 208 allocates the stock and cash amounts from the received settlement message to the optimum number of trades selected at 205. Such processing is described in greater detail with reference to FIGS. 3 and 4, and is divided into two parts. First, allocation occurs for all eligible purchase trades in the netted trade, if any (FIGS. 3A and 3B), and then allocation occurs for all eligible sales trades in the netted trade, if any (FIGS. 4A and 4B). Allocation processing will be described with reference to these figures in conjunction with a running example.

Assume that the settlement message from 105 in FIG. 1 contains at least the data shown in Table 1 below, bearing in mind that a positive stock amount and a negative cash amount means a net buy, and a negative stock amount and a positive cash amount means a net sell. Accordingly, the data in Table 1 indicates a net sale. Further, for the running example, assume that all indicated shares are shares of Company "X," which have had a stable market value of $1/share.

TABLE 1

| Data in Settlement Message | |
|---|---|
| Total Net Amount of Stock Delivered with Settlement Message | Total Net Amount of Cash Delivered with Settlement Message |
| −5 Shares | $5 |

Further, assume that the data from the trade selection process 205 in FIG. 2 (and 106 in FIG. 1 compiled at least the data shown in Table 2, below. The data in Table 2 indicates the trades that are eligible for allocation. Note that the ordering of "Trade 1" and "Trade 2" is intentional.

TABLE 2

| Trades Eligible for Allocation | | | |
|---|---|---|---|
| | Trade Type | Stock Amount | Cash Amount |
| Trade 2 | Purchase | 10 Shares | −$10 |
| Trade 1 | Purchase | 5 Shares | −$5 |
| Trade 3 | Sale | −20 Shares | $20 |

Figure 3A:
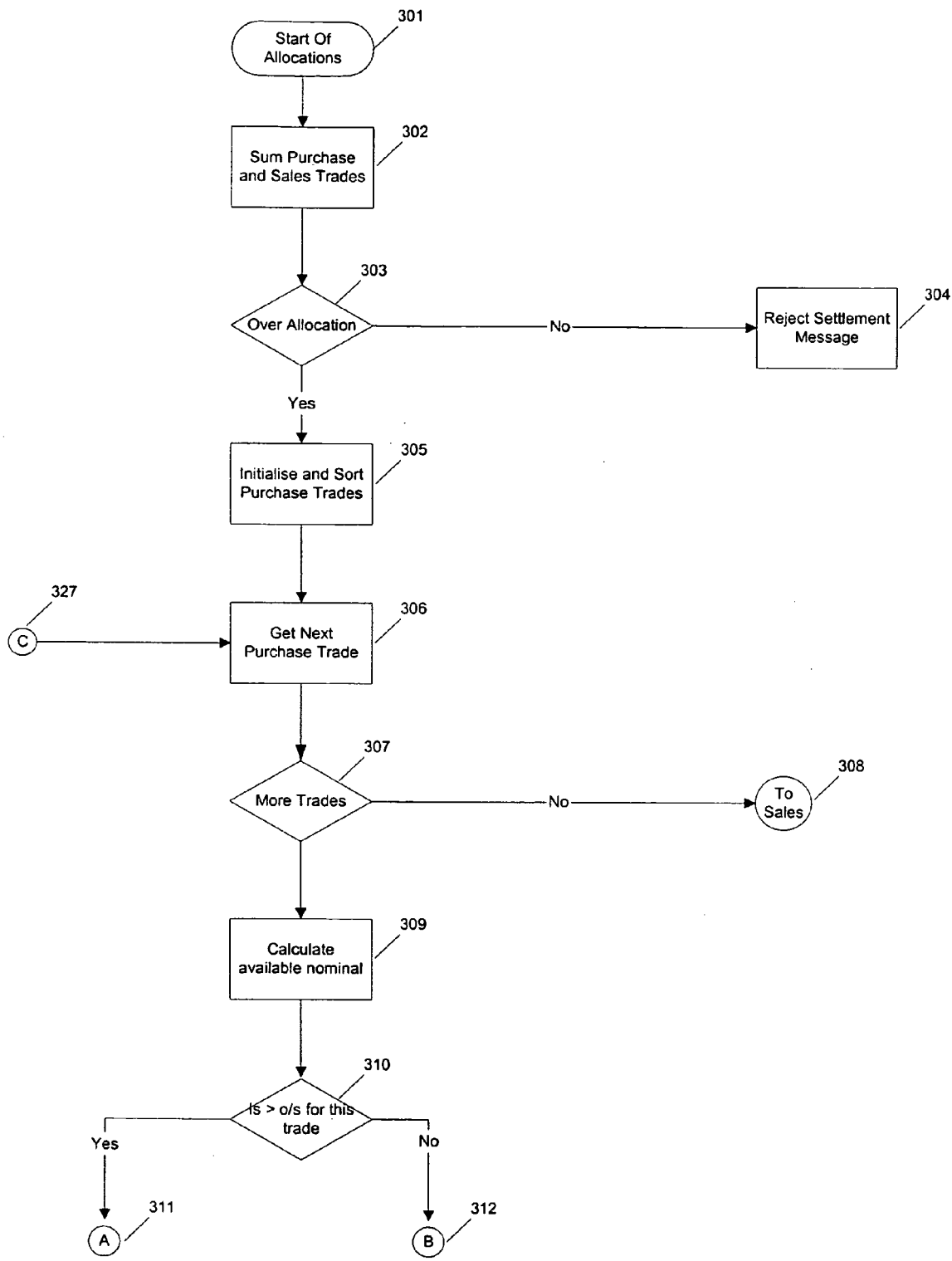
FIGS. 3A and 3B are flowcharts illustrating a first portion of the allocation processing according to the exemplary embodiment.
Figure 4A:
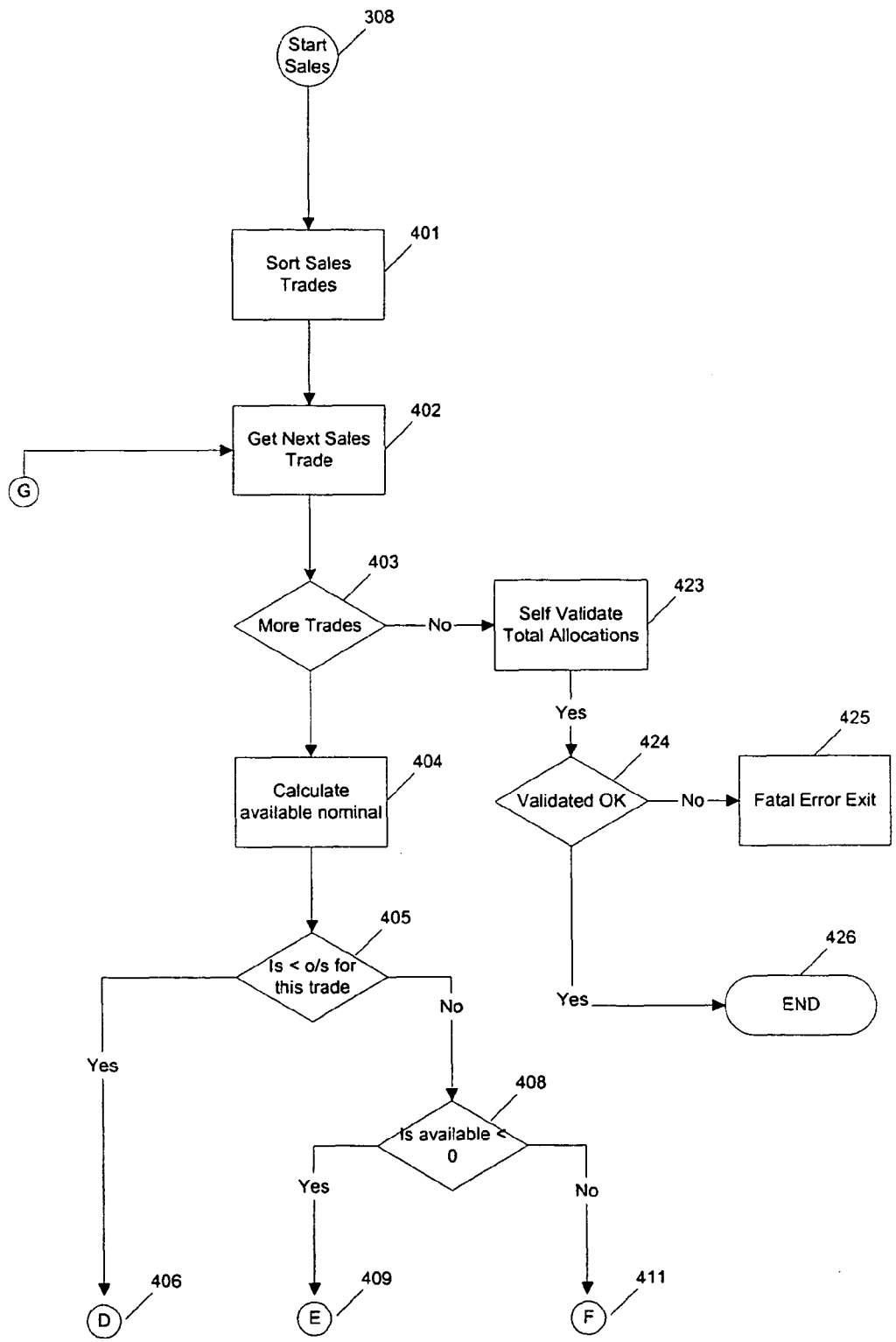
FIGS. 4A and 4B are flowcharts illustrating a second portion of the allocation processing according to the exemplary embodiment.
Figure 4B:
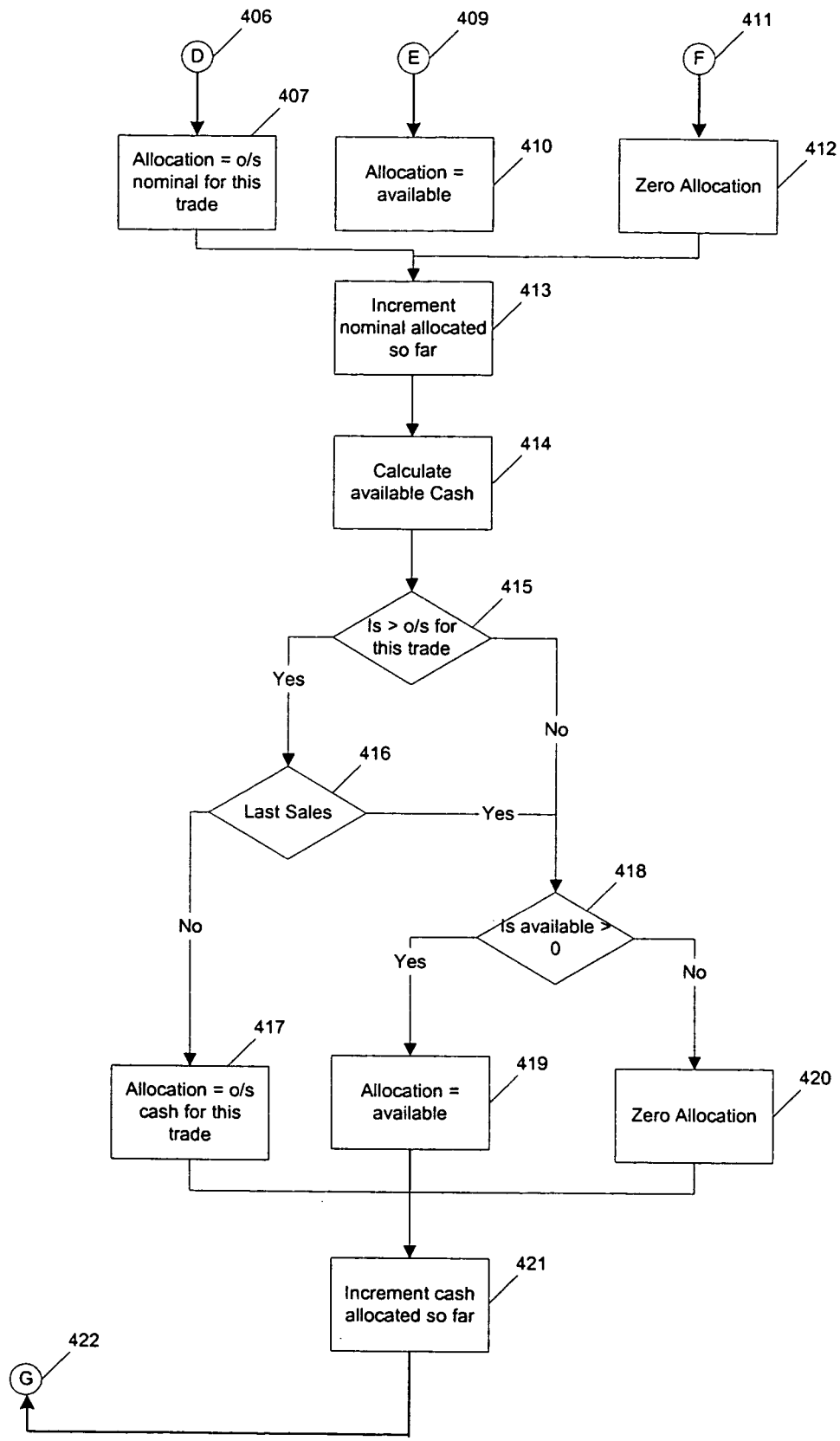

With the data in Tables 1 and 2, allocation processing begins at 301 in FIG. 3A. At 302, the total stock amounts and cash amounts of all trades eligible for allocation is calculated. In the running example, the data in Table 2 is summed, resulting in the data of Table 3, below.

TABLE 3

| Totals from Trades Eligible for Allocation | |
|---|---|
| Total Net Amount of Stock from Eligible Trades | Total Net Amount of Cash from Eligible Trades |
| −5 Shares | $5 |

After summing the purchase and sales trades at 302, a check is made at 303 to determine whether an "over allocation" condition exists, i.e., that there are trades eligible for allocation. If allocation is not required, then the settlement message is rejected at 304. Otherwise, processing proceeds to 305.

At 305, all purchase trades, if any, are ordered by stock ascending and cash descending, so that the purchase trades will be processed starting with the smallest trade first. Sorting the trades in this particular order allows for an optimum number of purchase trades to be processed in the event that there is not enough stock, cash, or both available to be allocated to all purchase trades eligible for allocation. Additionally, purchase trades may be ordered so that older purchase trades are given priority over newer purchase trades. In the running example, the ordering of step 305 modifies the data in Table 2 so that "Trade 1" and "Trade 2" are flipped in position, as shown in Table 4, below. (Note that in the tables used throughout this specification, bold type indicates a location where data has changed.)

TABLE 4

Trades Eligible for Allocation with Sorted Purchase Trades

| | Trade Type | Stock Amount | Cash Amount |
|---|---|---|---|
| Trade 1 | Purchase | 5 Shares | −$5 |
| Trade 2 | Purchase | 10 Shares | −$10 |
| Trade 3 | Sale | −20 Shares | $20 |

At 306, the next purchase trade, which may be the first purchase trade, is selected for processing. In this example, "Trade 1" is selected. If no purchase trades exists, or no more purchase trades remain, it is determined at 307 to move on to processing sales trades at 308. Sales trades are described later with reference to FIGS. 4A and 4B.

If it is determined that purchase trades exist at 307, which in the running example is true, the "available stock" for allocation is calculated at 309. The "available stock" is calculated as the total net amount of stock delivered, as indicated by the settlement message (Table 1, for example), less the total outstanding stock for all sales trades less the amount allocated so far. This calculation can be summarized below:

$$\text{Available Stock} = [\text{Total Stock Delivered}] - [\text{Total Outstanding Stock for All Sales Trades}] - [\text{Total Stock Allocated}] \quad (1)$$

The total outstanding stock for all sales trades is the sum of all shares sold by the sales trades eligible for allocation. In the running example, referring to Table 4, "Trade 3" is the only sales trade, and therefore, the total outstanding stock for all sales trades is negative 20 shares. Further in regard to this example, because nothing has yet been allocated, "Total Stock Allocated" in equation 1 is zero. Accordingly, "available stock"=[−5 shares]−[−20 shares]−[0]=positive 15 shares.

After calculating the "available stock" at 309, the "available stock" is compared to the outstanding number of shares for the current purchase trade at 310, which in the running example is 5 shares (See "Trade 1" of Table 4). If the "available stock" is greater than the outstanding stock amount for this trade, then processing moves to 311, which connects to 313 in FIG. 3B. At 313, the outstanding stock amount for the current trade is allocated to the current trade. Otherwise, processing proceeds to 312, which is connected to 314 in FIG. 3B. At 314, it is determined whether "available stock" is greater than zero. If the "available stock" of equation 1 is greater than zero, then the "available stock" amount is allocated to the current trade at 315. Otherwise, no allocation is made at 316.

In the running example, "available stock" is 15 shares, and the outstanding amount for "Trade 1" is 5 shares. Accordingly, "available stock" is greater than the outstanding amount at 310, and accordingly, "Trade 1" is allocated the outstanding amount for Trade 1 at 313, which is 5 shares.

After determining the amount to allocate to the current trade at 313, 315, or 316, the amount of stock allocated is added to the total amount of stock allocated so far at 317. In the running example, after adding the 5 shares allocated to "Trade 1," the total amount of stock allocated so far is 5 shares. In summary, this information is shown in Table 5, below.

TABLE 5

Allocation Status

| | Trade Type | Stock Amount | Cash Amount | Stock Allocated | Cash Allocated |
|---|---|---|---|---|---|
| Trade 1 | Purchase | 5 Shares | −$5 | 5 Shares | |
| Trade 2 | Purchase | 10 Shares | −$10 | | |
| Trade 3 | Sale | −20 Shares | $20 | | |
| Total | N/A | N/A | N/A | 5 Shares | |

After updating the stock allocated thus far at 317, the "Available Cash" is calculated at 318 as the total net amount of cash delivered, as indicated by the settlement message (Table 1, for example), less the total outstanding cash amount for all sales trades less the amount of cash allocated so far. This calculation can be summarized below:

$$\text{Available Cash} = [\text{Total Cash Delivered}] - [\text{Total Outstanding Cash for All Sales Trades}] - [\text{Total Cash Allocated}] \quad (2)$$

The total outstanding cash for all sales trades is the sum of all cash received by the sales trades eligible for allocation. In this example, referring to Table 5, "Trade 3" is the only sales trade, and therefore, the total outstanding cash for all sales trades is $20. Further in regard to the running example, because no cash has yet been allocated, "Total Cash Allocated" in equation 1 is zero. Accordingly, "available cash"=[$5]−[$20]−[$0]=negative $15.

After "available cash" according to equation 2 is calculated at 318, it is determined whether "available cash" is less than the outstanding cash amount for the current trade at 319. If the "available cash" is less than the outstanding amount for the current trade, it is determined whether or not the current trade is the last purchase trade at 320. If the current trade is not the last purchase trade, the cash amount allocated at 321 to the current trade is the outstanding cash amount for the current trade.

However, if the current trade is the last purchase trade eligible for allocation at 320, then it is determined whether any sales trades exist that are eligible for allocation at 322. If sales trades do exist, the cash amount allocated to the current trade is the outstanding cash amount for the current trade at 321. If no sales trades exist at 322, or if it is determined at 319 that the "available cash" is not less than the outstanding amount for the current trade, then it is determined whether the "available cash" according to equation 2 is less than zero at 323. If the "available cash" is less than zero, the cash amount allocated to the current trade is the "available cash" at 324. If the "available cash" is not less than zero at 323, no cash is allocated to the current trade at 325.

After allocating the appropriate amount of cash to the current trade at 321, 324, or 325, the amount allocated to the current trade is added to the total amount of cash allocated thus far at 326.

Referring back to 319 and the running example, "available cash," according to equation 2, is −$15 as previously calculated. On the other hand, the outstanding cash amount for the current trade, "Trade 1," is −$5, as indicated in Table 5 above. Accordingly, "available cash" is less than the outstanding cash amount for "Trade 1," and processing moves from 319 to 320. At 320, "Trade 1" is not the last purchase trade because "Trade 2," which is also a purchase trade, has not been processed. (See Table 5.) Accordingly, processing moves to 321, and "Trade 1" is allocated the outstanding cash amount for "Trade 1," which is −$5. This −$5 amount is then added to the total amount of cash allocated thus far so that the total amount of cash allocated is now: $0+[−$5]=−$5. The current state of the allocation processing is shown in Table 6 below.

TABLE 6

Allocation Status

| | Trade Type | Stock Amount | Cash Amount | Stock Allocated | Cash Allocated |
|---|---|---|---|---|---|
| Trade 1 | Purchase | 5 Shares | −$5 | 5 Shares | −$5 |
| Trade 2 | Purchase | 10 Shares | −$10 | | |
| Trade 3 | Sale | −20 Shares | $20 | | |
| Total | N/A | N/A | N/A | 5 Shares | −$5 |

Figure 3B:
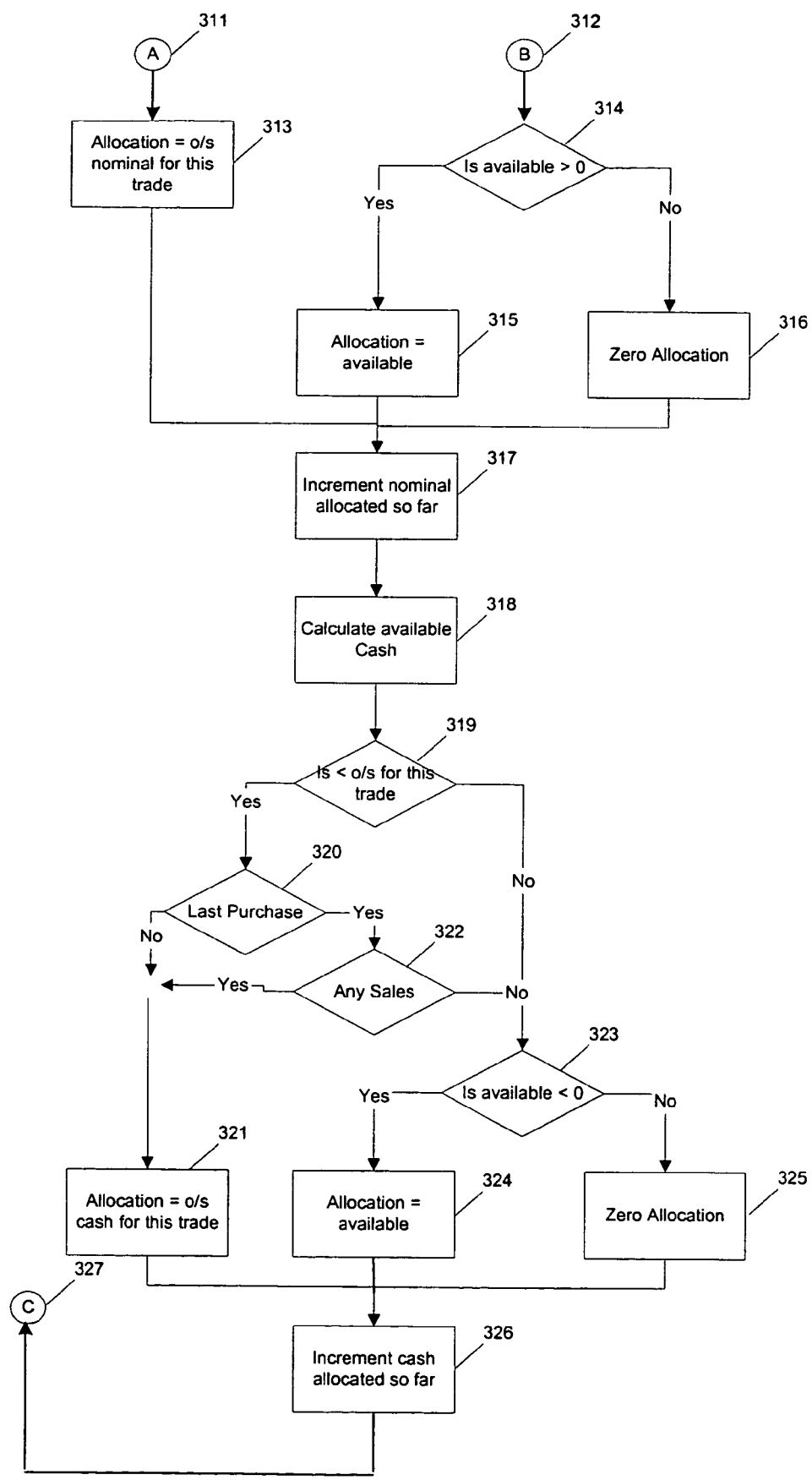

After incrementing the total amount of cash allocated at 326, processing proceeds to 327, which connects to 306 in FIG. 3B, where the next purchase trade is processed as discussed. Referring to the running example, "Trade 2" of Table 6 is selected for allocation processing at 306. Because "Trade 2" is another purchase trade, it is determined that more purchase trades exist at 307. At 309, "available stock" is again calculated according to equation 1. In the running example, "available stock"=[−5 shares]−[−20 shares]−[5 shares]=10 shares.

At 310, the "available stock" is compared to the outstanding stock amount for the current trade, "Trade 2," which is 10 shares. Because "available stock" and the outstanding stock amount for "Trade 2" are equal at 10 shares, processing moves from 310 to 312, which connects to 314 in FIG. 3B. At 314 it is determined whether the "available stock" is greater than zero. Because "available stock" is 10 shares in the running example, the answer is "yes," and processing moves to 315. At 315, the current trade, "Trade 2," is allocated the "available stock," which is 10 shares. At 317, the allocated 10 shares is added to the total amount of stock thus far allocated, bringing the total to 15 shares. The current state of the allocation processing is shown in Table 7 below.

TABLE 7

Allocation Status

| | Trade Type | Stock Amount | Cash Amount | Stock Allocated | Cash Allocated |
|---|---|---|---|---|---|
| Trade 1 | Purchase | 5 Shares | −$5 | 5 Shares | −$5 |
| Trade 2 | Purchase | 10 Shares | −$10 | 10 Shares | |
| Trade 3 | Sale | −20 Shares | $20 | | |
| Total | N/A | N/A | N/A | 15 Shares | −$5 |

After adjusting the total amount of stock allocated at 317, cash allocation begins at 318, where the "available cash" is calculated according to equation 2. In the running example, "available cash"=[$5]−[$20]−[−$5]=negative $10. At 319, "available cash" is compared to the outstanding cash amount for the current trade, "Trade 2," which is −$10. Because "available cash" is equal to the outstanding amount for "Trade 2," processing proceeds from 319, 323. At 323, because "available cash" is less than zero, processing moves to 324. At 324, the "available cash,"−$10, is allocated to "Trade 2.". At 326, the −$10 allocated to "Trade 2" is added to the total amount of cash allocated, bringing the total to −$15. The current state of the allocation processing is shown in Table 8 below.

TABLE 8

Allocation Status

| | Trade Type | Stock Amount | Cash Amount | Stock Allocated | Cash Allocated |
|---|---|---|---|---|---|
| Trade 1 | Purchase | 5 Shares | −$5 | 5 Shares | −$5 |
| Trade 2 | Purchase | 10 Shares | −$10 | 10 Shares | −$10 |
| Trade 3 | Sale | −20 Shares | $20 | | |
| Total | N/A | N/A | N/A | 15 Shares | −$15 |

Having completed allocation for "Trade 2," processing proceeds to 327, which connects to 306 in FIG. 3A. At 306, the next purchase trade is acquired. However, no more unallocated purchase trades exist at 307, so processing moves to sales trade processing at 308, which connects to 401 in FIG. 4A.

At 401, all sales trades, if any, are ordered by nominal ascending and cash descending, so that the sales trades will be processed starting with the smallest trade first. Sorting the trades in this particular order allows for an optimum number of sales trades to be processed in the event that there is not enough stock, cash, or both available to be allocated to all sales trades eligible for allocation. Additionally, sales trades may be ordered so that older sales trades are given priority over newer sales trades. In the running example, the ordering of step 401 does not modify the trade ordering of Table 8 because only one sales trade, "Trade 3," exists.

After sorting the sales trades at 401, the next sales trade in the sorted list, which may be the first sales trade, is selected for allocation processing at 402. If no more unallocated trades exist, as determined at 403, a validation of total allocation values is performed at 423. The "Self Validation" performed at 423 checks to ensure that the total stock and cash amounts allocated are equal to the amounts received in the settlement message. If these values are not equal, validation fails at 424 and a fatal error condition is generated at 425. (Note that events 424 and 425 are the same as events 209 and 210 in FIG. 2.) If these values are equal, validation passes at 424 and allocation processing is complete at 426. After completion of allocation processing at 426, the settlements postings process of 211 in FIG. 2 occurs, which will be described later.

Stepping back to 403 in FIG. 4A, if more unallocated sales trades do exist, the "available stock" is calculated at 404. The available stock amount in this situation is calculated as the total net amount delivered in the settlement message (Table 1, for example) less the stock allocated so far. The stock allocated so far is carried forward from the purchase trade processing described with respect to FIGS. 3A and 3B (Table 8, for example). The calculation of "available stock" for sales trades is summarized in equation 3 below.

Available Stock=[Total Stock Delivered]−[Total Stock Allocated]        (3)

Referring to the running example, "available stock"=[−5 shares]−[15 shares]=negative 20 shares.

After calculating "available stock" according to equation 3 at 404, "available stock" is compared to the outstanding stock amount for the current trade at 405. If "available stock" is less than the outstanding amount for the current trade, processing moves to 406, which connects to 407 in FIG. 4B, where the outstanding stock amount for the current trade is allocated to the current trade. Otherwise, it is determined whether the "available stock" is less than zero at 408. If it is determined that "available stock" is less than zero at 408, processing proceeds to 409, which connects to 410 in FIG. 4B. At 410 the amount of the "available stock" is allocated to the current trade. If it is determined that "available stock" is not less than zero at 408, processing proceeds to 411, which connects to 412 in FIG. 4B. At 412, no stock is allocated to the current trade.

After determining the proper allocation for the current trade at 407, 410, or 412, the amount allocated to the current trade is added to the total amount of stock allocated thus far at 413.

Returning to 405 in FIG. 4A for the sake of the running example, recall that the "available stock" was calculated to be negative 20 shares at 404. Further, the outstanding stock amount for the current trade, "Trade 3," is negative 20 shares, as shown in Table 8. Therefore, "available stock" is not less than the outstanding stock amount for "Trade 3" at 405, and processing moves to 408. Because "available stock" is less than zero at 408, processing moves to 409, which connects to 410 in FIG. 4B. At 410, the amount of "available stock," which is negative 20 shares, is allocated to "Trade 3." At 413, this negative 20 shares is added to the total stock allocated thus far, resulting in [15 shares]+[−20 shares]=negative 5 shares. Accordingly, the current state of the allocation processing is shown in Table 9 below.

TABLE 9

| | Allocation Status | | | | |
|---|---|---|---|---|---|
| | Trade Type | Stock Amount | Cash Amount | Stock Allocated | Cash Allocated |
| Trade 1 | Purchase | 5 Shares | −$5 | 5 Shares | −$5 |
| Trade 2 | Purchase | 10 Shares | −$10 | 10 Shares | −$10 |
| Trade 3 | Sale | −20 Shares | $20 | −20 Shares | |
| Total | N/A | N/A | N/A | −5 Shares | −$15 |

Now, the available cash amount is calculated at 414 as the total net delivered in the settlement message less the amount of cash allocated so far. The cash allocated so far is carried forward from the purchase trade processing described with respect to FIGS. 3A and 3B (Table 8, for example). The calculation of "available cash" for sales trades is summarized in equation 4 below.

Available Cash=[Total Cash Delivered]−[Total Cash Allocated]  (4)

In the running example, "available cash" according to equation 4 is [$5]−[−$15]=positive $20.

After calculating "available cash" according to equation 4 at 414, "available cash" is compared to the outstanding cash amount for the current trade at 415. If "available cash" is greater than the outstanding amount for the current trade, processing moves to 416, where it is determined whether the current trade is the last sales trade. If it is not the last sales trade at 416, the amount allocated to the current trade is the outstanding cash amount for the current trade at 417. If the current trade is the last sales trade at 416, or if it is determined at 415 that the "available cash" is not greater than the outstanding cash amount for the current trade, then it is determined whether the "available cash" is greater than zero at 418. If so, the amount allocated to the current trade is the "available cash" amount at 419. If not, no money is allocated to the current trade at 420. After determining the proper allocation for the current trade at 417, 419, or 420, the amount of cash allocated to the current trade is added to the total amount of cash allocated thus far at 421.

Returning to 415 for the sake of the running example, recall that the "available cash" was calculated to be $20 at 414. Further, the outstanding cash amount for the current trade, "Trade 3," is $20, as shown in Table 9. Therefore, "available cash" is not greater than the outstanding stock amount for "Trade 3" at 415, and processing moves to 418. Because "available cash" is greater than zero at 418, processing moves to 419, where the amount of "available cash," which is $20, is allocated to "Trade 3." At 421, this allocated $20 is added to the total cash allocated thus far, resulting in [−$15]+[$20] =positive $5. Accordingly, the current state of the allocation processing is shown in Table 10 below.

TABLE 10

| | Allocation Status | | | | |
|---|---|---|---|---|---|
| | Trade Type | Stock Amount | Cash Amount | Stock Allocated | Cash Allocated |
| Trade 1 | Purchase | 5 Shares | −$5 | 5 Shares | −$5 |
| Trade 2 | Purchase | 10 Shares | −$10 | 10 Shares | −$10 |
| Trade 3 | Sale | −20 Shares | $20 | −20 Shares | $20 |
| Total | N/A | N/A | N/A | −5 Shares | $5 |

After incrementing the cash allocated thus far at 421, processing proceeds to 422, which connects to 402 in FIG. 4A, where the next sales trade is selected for allocation as just described. In the running example, no more sales trades exist at 403, so a self validation of the total allocations is performed at 423. In other words, the total stock and cash allocated throughout the allocation process is compared to the total net amount of stock and cash delivered as indicated in the settlement message. In this scenario, the total stock allocated is negative 5 shares and the total cash allocated is $5, as shown in Table 10, and the total net amount of stock and cash delivered, as indicated in the settlement message of Table 1, is negative 5 shares and $5, respectively. Accordingly, these values match up and validation passes at 424 (and 209 in FIG. 2). Accordingly, the allocation process completes at 426 and processing moves to 211 in FIG. 2. At 211 in FIG. 2, the amounts of stock and cash to be posted against each trade are taken from the final table of trade allocations, ignoring any trades with zero allocations, and the relevant systems' posting routines, as known in the art, are invoked for each trade. In the running example, the stock and cash allocated for "Trade 1," "Trade 2," and "Trade 3" are posted for each trade. After the posting process, processing is complete at 212.

It is to be understood that the exemplary embodiment is merely illustrative of the present invention and that many variations of the above-described embodiment and example can be devised by one skilled in the art without departing from the scope of the invention. It is therefore intended that all such variations be included within the scope of the following claims and their equivalents.

We claim:

1. A computer-implemented method for allocating stock and cash amounts to individual trades combined into a netted trade, the method comprising:

receiving, via a computer, a single settlement message that applies to settlement of the netted trade, the settlement message identifying stock and cash amounts to be delivered based upon the combined individual trades in the netted trade;

identifying, via the computer, the individual trades in the netted trade that are eligible for allocation of the stock and cash amounts identified in the settlement message, by matching a message-trade identifier in the settlement message with an internal-trade identifier in the computer;

identifying, via the computer, the individual trades in the netted trade that are purchase trades;

identifying, via the computer, the individual trades in the netted trade that are sales trades;

sorting, via the computer, the purchase trades so that smaller purchase trades are before larger purchase trades;

allocating, via the computer, stock and cash amounts to the purchase trades as a group in sorted order;

sorting, via the computer, the sales trades so that smaller sales trades are before larger sales trades; and allocating, via the computer, stock and cash amounts to the sales trades as a group in sorted order.

2. The method according to claim 1 further comprising verifying that the stock and cash amounts allocated to the purchase and sales trades are consistent with the stock and cash amounts identified in the settlement message.

3. The method according to claim 1 wherein allocating stock and cash amounts to the purchase trades comprises:
   selecting a current purchase trade from the sorted purchase trades;
   performing a first calculation to determine an available stock amount for allocation;
   allocating a stock amount to the current purchase trade based at least upon the first calculation;
   updating the available stock to account for the stock amount allocated to the current purchase trade;
   performing a second calculation to determine an available cash amount for allocation;
   allocating a cash amount to the current purchase trade based at least upon the second calculation; and
   updating the available cash amount to account for the cash amount allocated to the current purchase trade.

4. The method according to claim 3 wherein the available stock amount is calculated as total stock delivered, minus total outstanding stock for all sales trades, minus total stock currently allocated, wherein the total stock delivered is the stock amount identified in the settlement message.

5. The method according to claim 3 wherein the available cash amount is calculated as total cash delivered, minus total outstanding cash for all sales trades, minus total cash currently allocated, wherein the total cash delivered is the cash amount identified in the settlement message.

6. The method according to claim 1 wherein allocating stock and cash amounts to the sales trades comprises:
   selecting a current sales trade from the sorted sales trades;
   performing a first calculation to determine an available stock amount;
   allocating a stock amount to the current sales trade based at least upon the first calculation;
   updating the available stock to account for the stock amount allocated to the current sales trade;
   performing a second calculation to determine an available cash amount for allocation;
   allocating a cash amount to the current sales trade based at least upon the second calculation; and
   updating the available cash amount to account for the cash amount allocated to the current sales trade.

7. The method according to claim 6 wherein the available stock amount is calculated as total stock delivered minus total stock currently allocated, wherein the total stock delivered is the stock amount identified in the settlement message.

8. The method according to claim 6 wherein the available cash amount is calculated as total cash delivered minus total cash currently allocated, wherein the total cash delivered is the cash amount identified in the settlement message.

9. A computer-implemented method for executing individual trades combined into a netted trade, the method comprising:
   transmitting, via a computer, information regarding the netted trade, receiving a single settlement message that applies to settlement of the netted trade;
   selecting, via the computer, the individual trades which are eligible for processing in accordance with the settlement message, wherein eligible trades are identified by matching a message-trade identifier in the settlement message with an internal-trade identifier in the computer;
   allocating, via the computer, stock and cash amounts to the eligible trades in a manner consistent with
   the settlement message, and
      posting, via the computer, the allocated stock and cash amounts to the eligible trades in accordance with said allocation.

10. The method according to claim 9 further comprising verifying the settlement message to be a netted settlement message.

11. The method according to claim 9 wherein said selecting occurs by matching identifiers unique to each trade within the individual trades to data within the settlement message.

12. The method according to claim 9 wherein said allocation further comprises:
   identifying trades within the individual trades that are purchase trades and trades that are sales trades;
   allocating stock and cash amounts to the purchase trades as a group;
   allocating stock and cash amounts to the sales trades as a group; and
   verifying that the stock and cash amounts allocated to the purchase and sales trades is consistent with the settlement message.

13. The method according to claim 12 wherein the allocating stock and cash amounts to the purchase trades comprises:
   sorting the purchase trades so that smaller purchase trades are before larger purchase trades; and
   for each of the sorted purchase trades, the method further comprises:
      selecting a current purchase trade from the sorted purchase trades;
      performing a first calculation to determine an available stock amount for allocation;
      allocating a stock amount to the current purchase trade based at least upon the first calculation;
      updating the available stock to account for the stock amount allocated to the current purchase trade;
      performing a second calculation to determine an available cash amount for allocation;
      allocating a cash amount to the current purchase trade based at least upon the second calculation; and
      updating the available cash amount to account for the cash amount allocated to the current purchase trade.

14. The method according to claim 13 wherein the available stock amount is calculated as total stock delivered, minus total outstanding stock for all sales trades, minus total stock currently allocated, wherein the total stock delivered is identified in the settlement message.

15. The method according to claim 13 wherein the available cash amount is calculated as total cash delivered, minus total outstanding cash for all sales trades, minus total cash currently allocated, wherein the total cash delivered is identified in the settlement message.

16. The method according to claim 13 wherein the allocating stock and cash amounts to the sales trades comprises:
sorting the sales trades so that smaller sales trades are before larger sales trades; and for each of the sorted sales trades, the method further comprises:
selecting a current sales trade from the sorted sales trades;
performing a third calculation to determine the available stock amount after allocating the purchase trades;
allocating a stock amount to the current sales trade based at least upon the third calculation;
updating the available stock to account for the stock amount allocated to the current sales trade;
performing a fourth calculation to determine the available cash amount for allocation after allocating the purchase trades;
allocating a cash amount to the current sales trade based at least upon the fourth calculation; and
updating the available cash amount to account for the cash amount allocated to the current sales trade.

17. The method according to claim 16 further comprising sorting the sales trades so that older sales trades are given priority over newer sales trades of a same size.

18. The method according to claim 16 wherein the available stock amount is calculated as total stock delivered minus total stock currently allocated, wherein the total stock delivered is identified in the settlement message.

19. The method according to claim 16 wherein the available cash amount is calculated as total cash delivered minus total cash currently allocated, wherein the total cash delivered is identified in the settlement message.

20. The method according to claim 13 further comprising sorting the purchase trades so that older purchase trades are given priority over newer purchase trades of a same size.

21. The method according to claim 12 further comprising:
determining an available cash amount to be allocated;
determining an available stock amount to be allocated; and
allocating no stock or cash to a purchase trade, a sales trade, or both if there exists no available cash or stock to be allocated.

22. The method according to claim 9 further comprising summing the trades within the plurality of trades to determine a net amount of stock and a net amount of cash.

23. The method according to claim 22 further comprising determining whether an over delivery of stock, cash, or stock and cash has occurred by comparing the summed net amount of stock and cash amounts to data delivered in the settlement message.

24. The method according to claim 23 further comprising rejecting the settlement message due to an over delivery of stock.

25. The method according to claim 23 further comprising rejecting the settlement message due to an over delivery of cash wherein the over delivery of cash is greater than a predetermined tolerance amount.

26. A processing system for allocating stock and cash amounts to individual trades combined in a netted trade, the system comprising:
a storage component that stores instructions;
a communication device; and
a processing component communicatively connected to the storage device and communication device, the processing device programmed by the instructions to perform actions comprising:
transmitting information regarding the netted trade via the communication device;
receiving a single settlement message from the communication device that applies to settlement of the netted trade;
selecting eligible trades within the individual trades which are eligible for processing in accordance with the settlement message, wherein eligible trades are identified by matching a message-trade identifier in the settlement message with an internal-trade identifier in the processing system;
allocating stock and cash amounts to the eligible trades in a manner consistent with the settlement message, and
posting the allocated stock and cash amounts to the trades within the individual trades in accordance with said allocation.

27. The processing system according to claim 26 wherein the allocation further comprises:
identifying trades in the individual trades that are purchase trades and trades that are sales trades;
allocating stock and cash amounts to the purchase trades as a group;
allocating stock and cash amounts to the sales trades as a group; and
verifying that the stock and cash amounts allocated to the purchase and sales trades is consistent with the settlement message.

28. The processing system according to claim 27 wherein said allocating stock and cash amounts to the purchase trades comprises:
sorting the purchase trades so that smaller purchase trades are before larger purchase trades; and
for each of the sorted purchase trades, the processing component is programmed to perform actions further comprising:
selecting a current purchase trade from the sorted purchase trades;
performing a first calculation to determine an available stock amount for allocation;
allocating a stock amount to the current purchase trade based at least upon the first calculation;
updating the available stock to account for the stock amount allocated to the current purchase trade;
performing a second calculation to determine an available cash amount for allocation;
allocating a cash amount to the current purchase trade based at least upon the second calculation; and
updating the available cash amount to account for the cash amount allocated to the current purchase trade.

29. The processing system according to claim 28 wherein said allocating stock and cash amounts to the purchase trades further comprises sorting the purchase trades so that older purchase trades are given priority over newer purchase trades of a same size.

30. The processing system according to claim 28 wherein the available stock amount is calculated as total stock delivered, minus total outstanding stock for all sales trades, minus total stock currently allocated, wherein the total stock delivered is identified in the settlement message.

31. The processing system according to claim 28 wherein the available cash amount is calculated as total cash delivered, minus total outstanding cash for all sales trades, minus total cash currently allocated, wherein the total cash delivered is identified in the settlement message.

32. The processing system according to claim 28 wherein said allocating stock and cash amounts to the sales trades comprises:
sorting the sales trades so that smaller sales trades are before larger sales trades; and for each of the sorted sales trades, the processing component is programmed to perform actions further comprising:
selecting a current sales trade from the sorted sales trades;
performing a third calculation to determine the available stock amount after allocating the purchase trades;
allocating a stock amount to the current sales trade based at least upon the third calculation;
updating the available stock to account for the stock amount allocated to the current sales trade;
performing a fourth calculation to determine the available cash amount for allocation after allocating the purchase trades;
allocating a cash amount to the current sales trade based at least upon the fourth calculation; and
updating the available cash amount to account for the cash amount allocated to the current sales trade.

33. The processing system according to claim 32 wherein said allocating stock and cash amounts to the sales trades further comprises sorting the sales trades so that older sales trades are given priority over newer sales trades of a same size.

34. The processing system according to claim 32 wherein the available stock amount is calculated as total stock delivered minus total stock currently allocated, wherein the total stock delivered is identified in the settlement message.

35. The processing system according to claim 32 wherein the available cash amount is calculated as total cash delivered minus total cash currently allocated, wherein the total cash delivered is identified in the settlement message.

36. The processing system according to claim 27 wherein the processing component is programmed to perform actions further comprising:
determining an available cash amount to be allocated;
determining an available stock amount to be allocated; and
allocating no stock or cash to a purchase trade, a sales trade, or both if there exists no available cash or stock to be allocated.

37. The processing system according to claim 26 wherein the processing component is programmed to perform actions further comprising summing the trades within the plurality of trades to determine a net amount of stock and a net amount of cash.

38. The processing system according to claim 37 wherein the processing component is programmed to perform actions further comprising determining whether an over delivery of stock, cash, or stock and cash has occurred by comparing the summed net amount of stock and cash amounts to data delivered in the settlement message.

39. The processing system according to claim 38 wherein the processing component is programmed to perform actions further comprising rejecting the settlement message due to an over delivery of stock.

40. The processing system according to claim 38 wherein the processing component is programmed to perform actions further comprising rejecting the settlement message due to an over delivery of cash, wherein the over delivery of cash is greater than a predetermined tolerance amount.

* * * * *